United States Patent [19]

Fulk, Jr.

[11] Patent Number: 4,988,445
[45] Date of Patent: Jan. 29, 1991

[54] SPIRAL WOUND FILTRATION SYSTEM AND METHOD OF UTILIZING SAME

[75] Inventor: Clyde W. Fulk, Jr., Charlotte, N.C.

[73] Assignee: Koch Membrane Systems, Inc., Wilmington, Mass.

[21] Appl. No.: 483,391

[22] Filed: Feb. 22, 1990

[51] Int. Cl.⁵ .............................................. B01D 63/00
[52] U.S. Cl. ................................ 210/652; 210/195.2; 210/335; 210/340
[58] Field of Search ............... 210/634, 641, 644, 649, 210/652, 195.2, 257.2, 321.6, 321.71, 322, 323.1, 323.2, 335, 340

[56] References Cited

U.S. PATENT DOCUMENTS 4,784,771 11/1988 Wathen et al. ..................... 210/636
4,844,804 7/1989 Taylor .............................. 210/321.8
4,850,498 7/1989 Taylor ............................... 210/651

Primary Examiner—Frank Sever
Attorney, Agent, or Firm—Kokjer, Kircher, Bradley, Wharton, Bowman & Johnson

[57] ABSTRACT

A filtration system and method constitute the subject matter of the present invention. The system comprises first and second filtration stages which are joined in series with each stage comprising a plurality of filtration modules range for parallel flow. The concentrate from the first stage forms the feed for the second stage and a portion of the second stage concentrate is recirculated to the first stage feed stream. A feed pump and a recirculating pump together with appropriate flow controllers and valves provide means for effecting control over both pressure and flow rate within the system.

9 Claims, 2 Drawing Sheets

SPIRAL WOUND FILTRATION SYSTEM AND METHOD OF UTILIZING SAME

BACKGROUND OF THE INVENTION

This invention relates generally to filtration technology and, more specifically, to a method and apparatus for increasing the efficiency of a filtration system employing multiple stages.

While the invention will be described with particular reference to spiral wound filtration membranes and modules containing spiral wound membranes, it is to be understood that the invention is applicable to other types of filtration where multiple modules are employed.

A typical spiral wound filtration module is shown and described in U.S. Pat. No. 4,301,013, issued Nov. 17, 1981. Spiral wound filtration membranes have many advantages as a result of their high surface to volume ratio, low holdup volume, and generally uniform flow patterns. Spiral wound membranes are particularly useful in ultra filtration processes such as those used in the dairy industry for concentrating cheese whey as well as the separation and concentration of other separable components of a fluid milk product.

A typical spiral wound filtration system employs a spiral wound membrane that is wound around a perforated central tube and enclosed within a housing. Typically, multiple spiral wound membranes, also known as modules, are coupled in series within a single housing and one or more housings may also be joined together for carrying out the filtration process.

Two well-known configurations for filtration modules that are to be employed in a multiple stage filtration system are the so-called "once through" concept or "Christmas tree" design and the "recirculating" design.

In the well-known "once through" design, a plurality of housings each having multiple modules disposed therein are placed in parallel relationship and a feed stream is directed by parallel flow through the housings. The concentrate from the housings is then fed to a second stage which normally has fewer housings than the preceding stage. The feed is again directed by parallel flow through the second stage housings and the concentrate from this stage is directed to third stage. The third stage has fewer housings than the second stage and the number of housings is continually reduced in each successive stage until the final concentration is reached. The concentrate from the last two housings is the end product. This particular design is theoretically the most efficient means of operating a multiple stage filtration system, but it is limited in its versatility to process alternative feed rates. Also, as the permeability of the filtering media decreases during use, it is necessary to increase the system pressure to compensate. As the pressure increases, the flow rate may decrease because of limitations of the equipment thereby creating a counterproductive situation. Thus, the objective of maintaining a predetermined cross-flow velocity through the system is only partially met through compromising one factor in favor of another.

Another well-known design for a filtration system employing multiple modules is referred to as the "recirculating" design. A typical arrangement for a recirculating filtration system is shown in FIG. 1 of the drawing and will be discussed in greater detail hereinafter.

Briefly stated, the recirculating in series design employs a recirculating pump in association with each stage and a portion of the concentrate from each stage is recirulationd to the feed stream of that same stage. The recirculating design offers greater flexibility in controlling pressure and flow rate, but is also more expensive because of the additional pumping energy that is required.

OBJECTS OF THE INVENTION

It is, therefore, a primary objective of the present invention to provide a method and apparatus for a multiple stage filtration system which provides for greater flexibility within the system and greater control over pressure and flow rate than is possible with once through designs of the prior art and yet offers considerable cost savings over recirculating designs of the prior art.

An important objective of this invention is to provide a method and apparatus for accomplishing the advantages of a once through multiple stage filtration system by having two or more stages arranged in series, but also achieving some of the advantages of a recirculating design by employing a recirculating stream.

It is also an aim of my invention to provide for greater efficiency in a multiple stage filtration system by taking advantage of hardware design perameters which can allow for increasing system pressure at a much lower cost than increasing the system flow rate since hardware costs are influenced more by capacity than system pressure.

Still another objective of this invention is to provide a multiple stage filtration system which takes advantage of a recirculating design but at a much lower cost than conventional multiple stages in series recirculating systems by coupling multiple stages in series before recirculating rather than recirculating after each stage as has characterized the prior art.

Other objects of the invention will be made clear or become apparent from the following description and claims when read in light of the accompanying drawings wherein:

DETAILED DESCRIPTION OF THE PRIOR ART

Figure 1:
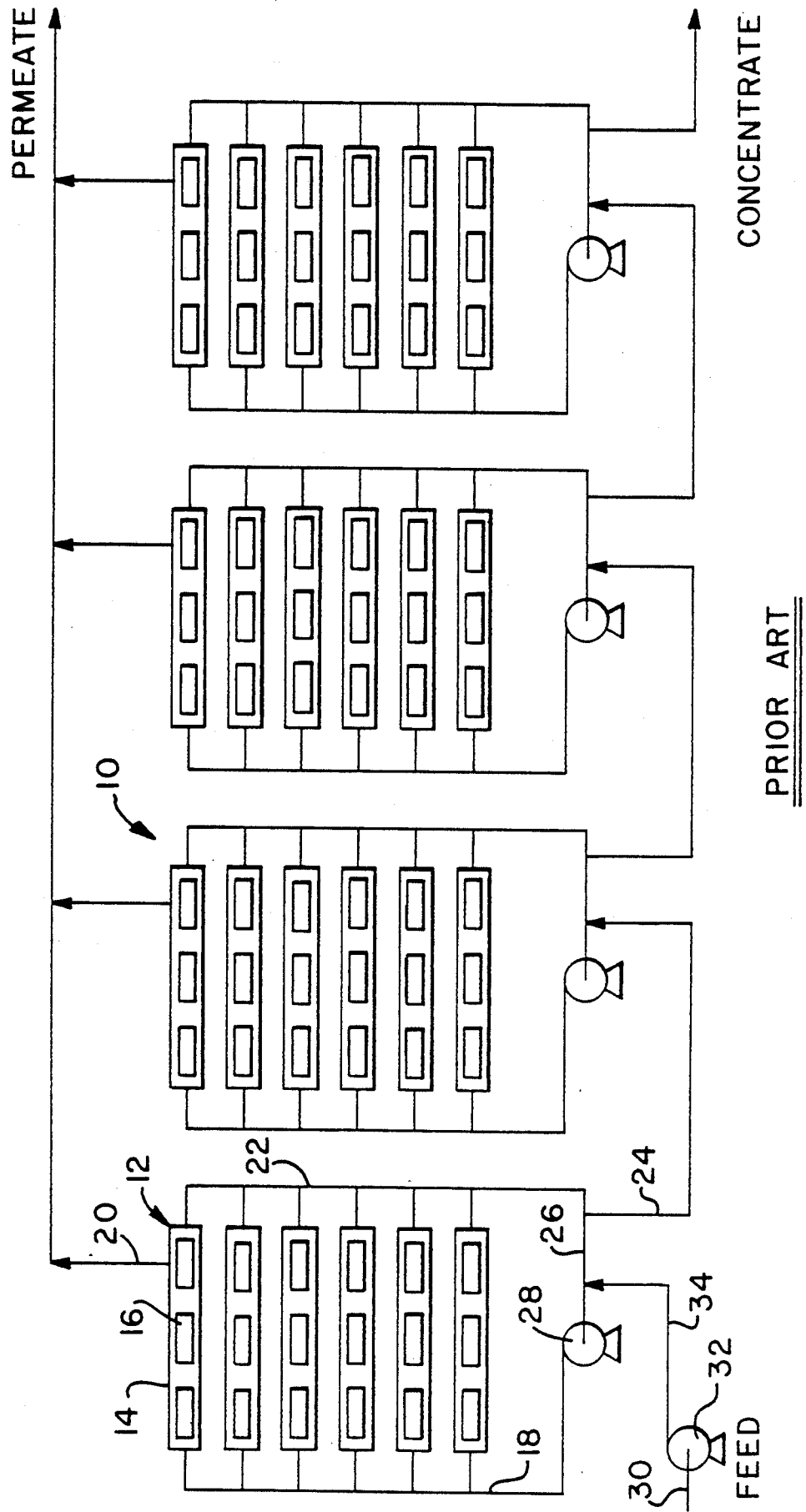
FIG. 1 is a schematic illustration of recirculating stages in series design that is well known in the prior art.

Referring initially to FIG. 1, as previously noted this is a schematic illustration of a recirculating stages in series design for a filtration system of the prior art. This system is designated generally by the numeral 10 and includes four identical recirculating stages, each of which is designated generally by the numeral 12. Each stage 12 includes a plurality of housings or vessels 14 arranged in parallel to accommodate parallel flow of a feed stream liquid. Each housing contains three modules 16 which, though not so shown, are connected in series within the housing. A feed line 18 is connected with each of the housings 14 for directing the liquid feed stream in parallel flow through the respective housings. The permeate from each housing 14 is directed through an appropriate conduit (not shown) to a main permeate conveying line 20. The concentrate output from each housing 14 is directed to a concentrate conveying line 22 which divides into a line 24 that serves as a feed stream line for the next stage and a recirculating line 26 that is coupled with a recirculating pump 28. The main feed stream to system 10 is via a feed line 30 coupled with a feed pump 32 which in turn is coupled with recirculating line 26 via a line 34. It is, of course, to be understood that appropriate valves and controllers (not shown) would be utilized to complete system 10.

The recirculating stages in series design of FIG. 1 operates by feeding liquid to be separated into permeate and concentrate fractions by introducing the liquid through feed 30, pumps 28 and 32, and lines 34 and 18, to the multiple housings 14. In the housings 14, the permeate passes radially through the individual modules 16 while the concentrate moves axially. A portion of the concentrate passes via lines 22 and 24 to the next stage while the remainder of the concentrate is recirculating via line 26 and pump 28 to the feed line 18. This system provides for improved control over pressure and flow rate (when compared with a "once through" design) as a result of the ability to vary the pressure head and volume through pumps 28 and 32. Because of the need to have a recirculating pump and associated valving and controllers for each stage, however, the cost of the recirculating stages in series design is relatively high. An example of the foregoing described system is shown in FIG. 1. Six housings in parallel per stage are employed with three modules in series within each housing. A total of four stages are shown. One pump and associated valves and controllers for each of the four stages would typically be required, in addition to the pump which feeds the first stage.

DETAILED DESCRIPTION OF THE INVENTION

Figure 2:
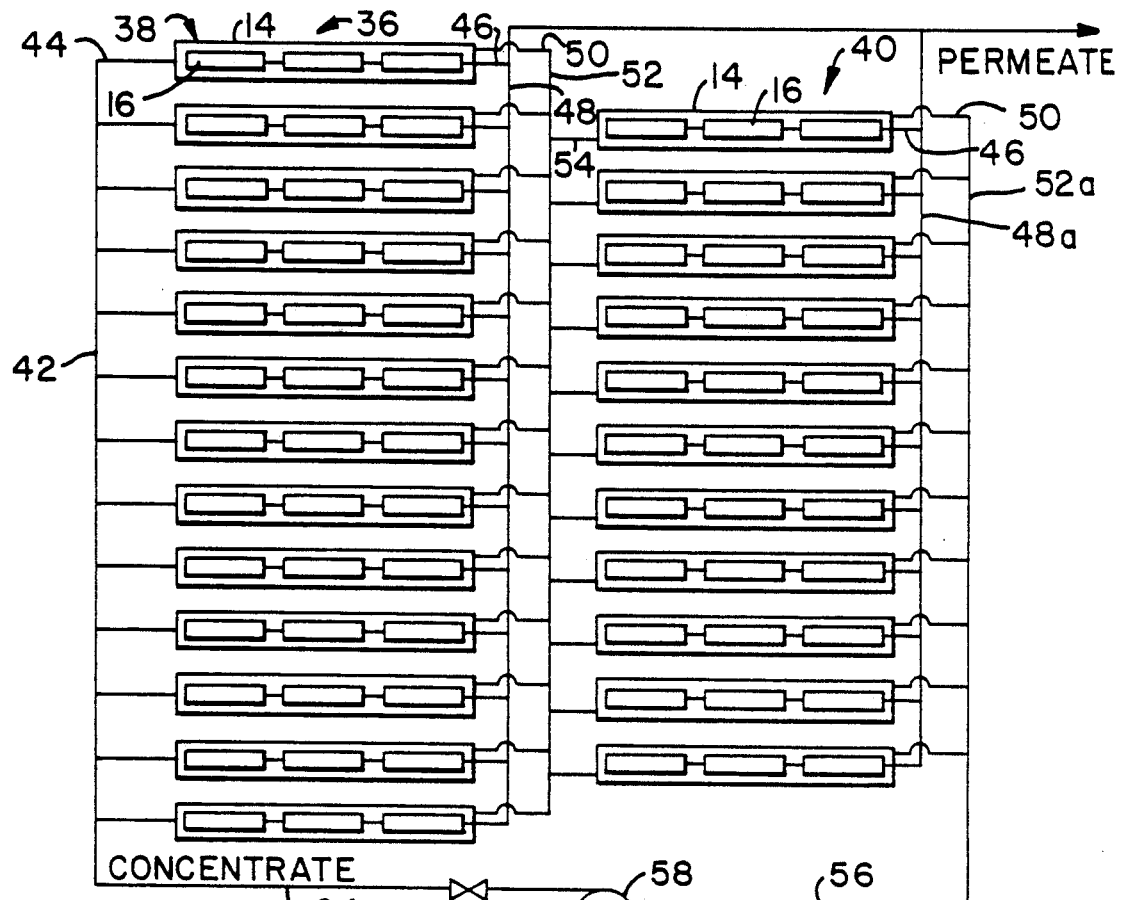
FIG. 2 is a schematic illustration of a system design incorporating the features of the present invention.

Turning now to the system of the present invention which is shown in FIG. 2 and designated generally by the numeral 36, this system includes two stages designated by the numerals 38 and 40. Stage 38 comprises a plurality of housings 14 that are disposed in parallel relationship and each contains three modules 16 connected in series within the housing. Each housing is fed by a supply manifold 42 having feeder lines 44 connected to the inlet of each housing. The permeate from the three modules 16 contained within a housing 14 is directed via a permeate line 46 to a trunk line 48 which is coupled with all of the lines 46 from the respective housings.

The concentrate output from each housing 14 is transported via a line 50 to a concentrate manifold 52 which is coupled with all of the lines 50 from the respective housings. Leading off of manifold 52 are a plurality of lines 54 which feed the housings 14 of the second stage 40.

As is readily apparent from viewing FIG. 2, second stage 40 is identical to first stage 38 with the exception that there are two fewer housings 14 in parallel. For clarity, the permeate trunk line of the second stage has been designated by the numeral 48a. The concentrate manifold for second stage 40 has been designated by the numeral 52a. A return line 56 extends from manifold 52a to a recirculating pump 58. A product outlet 60 removes that portion of the concentrate which does not move through line 56 and includes a control valve 62 for controlling the amount of concentrate leaving the system via this line. The output from recirculating pump 58 is moved through a connecting line 64 to supply manifold 42. A second control valve 62 is used to vary the amount of liquid passing through line 64.

A feed line 66 introduces the liquid to be separated to a feed pump 68 which is connected via line 70 to recirculating pump 58. A third control valve 62 is located in line 70 to control the output from pump 68. A first flow controller $C_1$ monitors the flow rate through valve 62 in line 70 and is connected via a control line 72 to a second controller $C_2$ which monitors the flow through the valve 62 of line 60.

Figure 3:
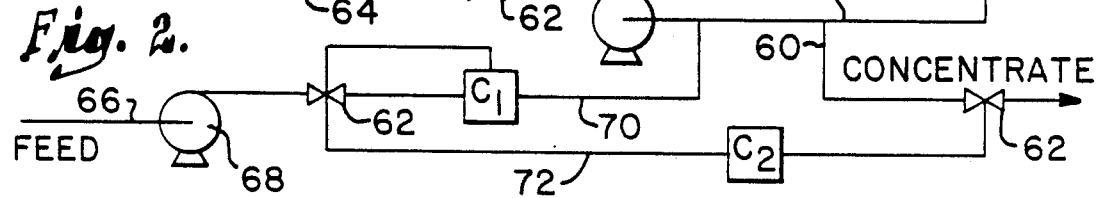
FIG. 3 is an enlarged cross-sectional view of a typical filtration module enclosed within a housing or vessel.
Figure 3:
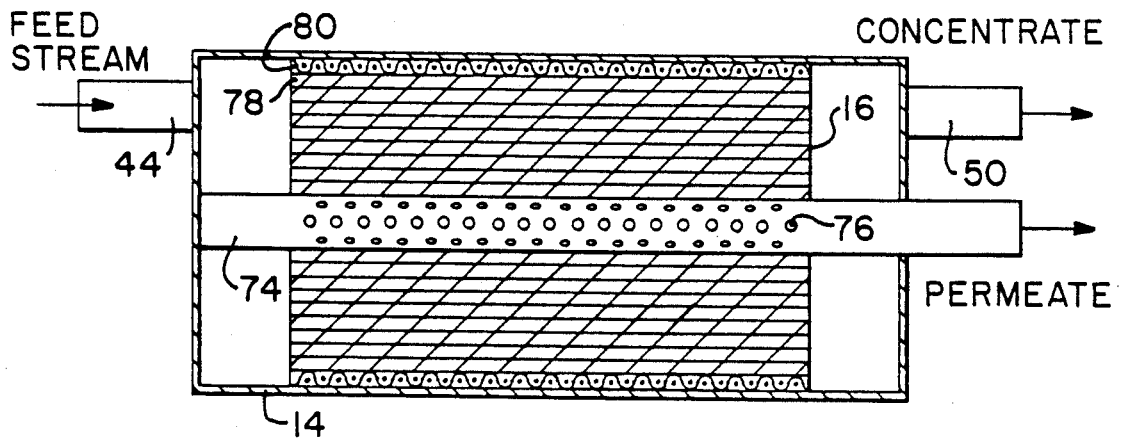

Referring now to FIG. 3, a housing 14 is shown in cross-sectional detail. It is to be noted that for purposes of simplicity and brevity only a single module 16 is shown in the housing while in actual practice multiple modules usually are present within any one housing 14. Mounted centrally through an opening in housing 14 is a permeate pipe 74 characterized by a plurality of openings 76 in the pipe wall. Wound around pipe 74 is a filtration material which may be comprised of multiple layers of a suitable membrane 78 the windings of which are separated by a membrane spacer 80 comprised of a loosely knitted inert material. One end of housing 14 is provided with a suitable opening (not shown) for receiving liquid feed from line 44. It is, of course, to be understood that the location of feeder line 44 may be at any place on the input side of housing 14. Another opening (not shown) at the outlet end of housing 14 communicates with concentrate output line 50 which connects with the concentrate manifold in the manner previously described. The permeate which passes through the filter media and openings 76 is collected in pipe 74 which communicates either with an adjoining permeate pipe of the next module or in the case of the final module within the connection is with permeate line 46 which delivers the permeate to a remote processing location through trunk line 48.

In operation, a fluid feed stream containing a liquid to be separated into a concentrate fraction and a permeate fraction is delivered via feed line 66 to feed pump 68 and thence to recirculating pump 58 and supply manifold 42. Valves 62 are utilized to control the flow through the pumps 58 and 68 while a third valve 62 located in product outlet 60 may be used to further control the pressure within the system by limiting the amount of product which is being taken off. Controllers $C_1$ and $C_2$ monitor the flow through valves 62 in the feed line 70 and the product outlet 60 and are designed to maintain a constant pressure flow ratio between the feed inlet 70 and outlet line 60 on opposite sides of the system. The third valve 62 (in line 64) allows the flow rate and pressure on the input side of the system to be controlled independently of controllers $C_1$ and $C_2$.

Liquid to be separated is directed to the first stage of the filtering system 38 where the feed stream is divided and passes simultaneously in parallel flow through first stage modules 14. The liquid passes through filtration modules 16 in each housing 14 where the permeate passes radically through the filtering media into permeate pipe 74 and the concentrate passes axially through the filter media and out the far end of the housing. Permeate is collected in the trunk line 48 which carries it to a remote location for further processing. Concentrate from each housing 14 is removed via line 50 where it is directed to the concentrate manifold 52.

The second stage 40 also has a plurality of housings 14, but fewer than the number of housings in the first stage (two fewer in the example shown). The reduction in the number of housings maintains an adequate cross-flow velocity by compensating for permeation. The concentrate from first stage 38 forms the feed for second stage 40 and is introduced into the second stage housings via lines 54. As indicated in FIG. 2, housings 14 in the second stage are also arranged for simultaneous parallel flow of the feed liquid through the housings. The second stage housings are, in effect, coupled in series with the corresponding housings of the first stage and further concentration of the liquid into permeate and concentrate fractions occurs in the second stage in the same manner as previously described for the first stage.

Permeate from the second stage is delivered via lines 46 to trunk line 48a which is coupled with the first stage trunk line 48. Concentrate from the second stage housing 14 is directed via lines 50 to the second stage concentrate manifold 52a which divides into lines 56 and 60. A portion of the concentrate is removed via line 60 and directed to a remote location for further processing. The remaining concentrate is recirculating through line 56 and recirculating pump 58. By employing a combination of once through and recirculating design features, considerable efficiencies are obtained which take advantage of hardware economics to increase the efficiency of the system. This increased efficiency is best understood by comparing FIGS. 1 and 2. It is to be noted that system 10 of the prior art illustrated in FIG. 1 has the same number of filtration modules 16 as the system 36 of the present invention. Because pump costs are most affected by pump flow rate capacity as opposed to pump head pressure, a single recirculating pump 58, which is only slightly larger in flow capacity and pressure rating than recirculating pump 28 of the prior art, may be employed. By arranging the modules according to the configuration suggested by the present invention, three of the four recirculating pumps 28 shown in FIG. 1 are completely eliminated. Further savings are realized by eliminating the valves, controllers and other hardware costs which must be associated with each recirculating stage.

The filtration system of the present invention also represents considerable operating efficiencies when compared with "once through" designs of the prior art because the utilization of recirculating pump 58 in combination with feed pump 68 provides the ability to control pressure and flow rate independently and to have a much wider operating range of flow rates and pressures than is possible with only a single pump.

It will be appreciated that the present invention also encompasses a method of filtering a liquid into permeate and concentrate fractions which includes providing a plurality of first filtration modules disposed in side-by-side relationship for receiving a feed stream which is passed through the modules in parallel flow. The concentrate from the plurality of first stage modules is fed to a plurality of second stage modules which are disposed in series with the first stage modules and in parallel with each other so that the concentrate proceeds in parallel flow through the second stage modules. The concentrate from the second stage is partially recirculated to the first stage where it joins the initial feed stream. It is preferable to sense the liquid flow rate during both the passing of the feed stream and the recirculated steps to maintain a constant flow pressure on the system as these two steps are performed.

While system economics are such that the equipment and method of the present invention will normally comprise two filtration stages, each having a plurality of modules in parallel which are joined in series between two stages, it is within the scope of the invention to join additional stages in series before the recycling step is carried out.

It should also be understood that the number of modules per housing and the number of housings per stage can be varied to meet the specifications for a particular filtration system. It is also to be noted that two adjacent housings 14 could be connected directly in series with the permeate pipe from one housing going directly to the permeate pipe in the next housing. The two end housings of the first stage could then have their concentrate output lines joined directly to one or more of the feed pipes for the second stage.

From the foregoing, it will be seen that this invention is one well adapted to attain all the ends and objects hereinabove set forth as well as other advantages which are likely to become apparent upon utilization of the invention in commercial applications.

It will be understood that certain features and subcombinations of the invention disclosed are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Having thus described the invention, I claim:

1. A filtration system for separating a fluid feed stream into a concentrate fraction and a permeate fraction, said system comprising:
   a first stage comprising a plurality of filtration modules disposed in side-by-side relationship for parallel flow of said fluid feed stream through said first stage modules, each of said modules having an inlet, a concentrate outlet, and a permeate outlet;
   a second stage comprising a plurality of filtration modules coupled in parallel with each other;
   means for enabling concentrate from said first stage module to pass directly to said second stage modules without passing through a pump;
   means for forcing said feed stream through said first and second stages; and
   means for recycling a portion of the concentrate from said second stage to said first stage.

2. A filtration system as set forth in claim 1, wherein the number of modules in said second stage is less than the number of modules in the first stage.

3. A filtration system as set forth in claim 2, wherein said means for forcing said feed stream comprises first pump means and said means for recycling a portion of the concentrate comprises second pump means and wherein is also included means for sensing the flow rate through both of said first and second pump means, said sensing means including means for maintaining a constant ratio between the flow rates of said first and second pump means; and wherein is further included flow control means for controlling the flow through one of said first and second pump means independent of said means for sensing the flow rate.

4. A filtration system as set forth in claim 1, wherein each of said modules comprises a spiral wound filtration membrane.

5. A filtration system for separating a fluid feed stream into a concentrate fraction and a permeate fraction, said system comprising:
   a first stage comprising a plurality of first housing members disposed in parallel relationship, each housing member having at least one spiral wound membrane module received therein, and each housing further having an inlet, a concentrate outlet and a permeate outlet;

means for introducing said feed stream to said first housing members;

a second stage comprising a plurality of second housing members disposed in parallel relationship with each other and coupled in series with some of said first housing members, the number of said second housing members being at least one fewer than the number of said first housing members, each of said second housings having an inlet, a concentrate outlet and a permeate outlet;

means for enabling concentrate from said first stage module to pass directly to said second stage modules without passing through a pump;

each of said second housing members having at least one spiral wound membrane module received therein; and means for recycling a portion of the concentrate from said second stage housings to said first stage housings.

6. A method of filtering a liquid comprised of at least two separable components, said method comprising the steps of:

providing a plurality of first filtration modules in side-by-side relationship;

passing a feed stream of said liquid through said modules in parallel flow;

feeding the concentrate from said first modules directly to a plurality of second modules without passing through a pump, said second modules being disposed in side-by-side relationship for parallel flow of said concentrate through the second modules; and recycling a portion of the concentrate from said second modules to said feed stream.

7. A method as set forth in claim 6, wherein the number of modules in said second plurality is less than the number of modules in said first plurality.

8. A method as set forth in claim 7, wherein is included the steps of:

sensing the liquid flow rate during both said passing and recycling steps and maintaining a substantially constant flow ratio as these two steps are performed.

9. A method as set forth in claim 8, wherein is included the step of controlling the liquid flow during at least one of said passing and recycling steps independently of said maintaining step.

* * * * *

UNITED STATES PATENT AND TRADEMARK OFFICE
CERTIFICATE OF CORRECTION

PATENT NO. : 4,988,445

DATED : January 29, 1991

INVENTOR(S) : Clyde W. Fulk, Jr.

It is certified that error appears in the above-identified patent and that said Letters Patent is hereby corrected as shown below:

Column 2, line 2, please delete the word --recirulationd-- and insert in its place the word "recirculated".

Column 4, line 45, please insert the word "line" before the numeral "60".

Same Column, line 56, please delete the word --radically-- and insert in its place the word "radially".

IN THE ABSTRACT:

Front page, under the title "ABSTRACT", line 5, delete the word --range-- and insert in its place the word "arranged".

Signed and Sealed this

Second Day of March, 1993

Attest:

STEPHEN G. KUNIN

Attesting Officer

Acting Commissioner of Patents and Trademarks